June 22, 1965 W. E. PARK 3,191,050
ENGINE GENERATOR SET
Filed Oct. 25, 1961 2 Sheets-Sheet 2
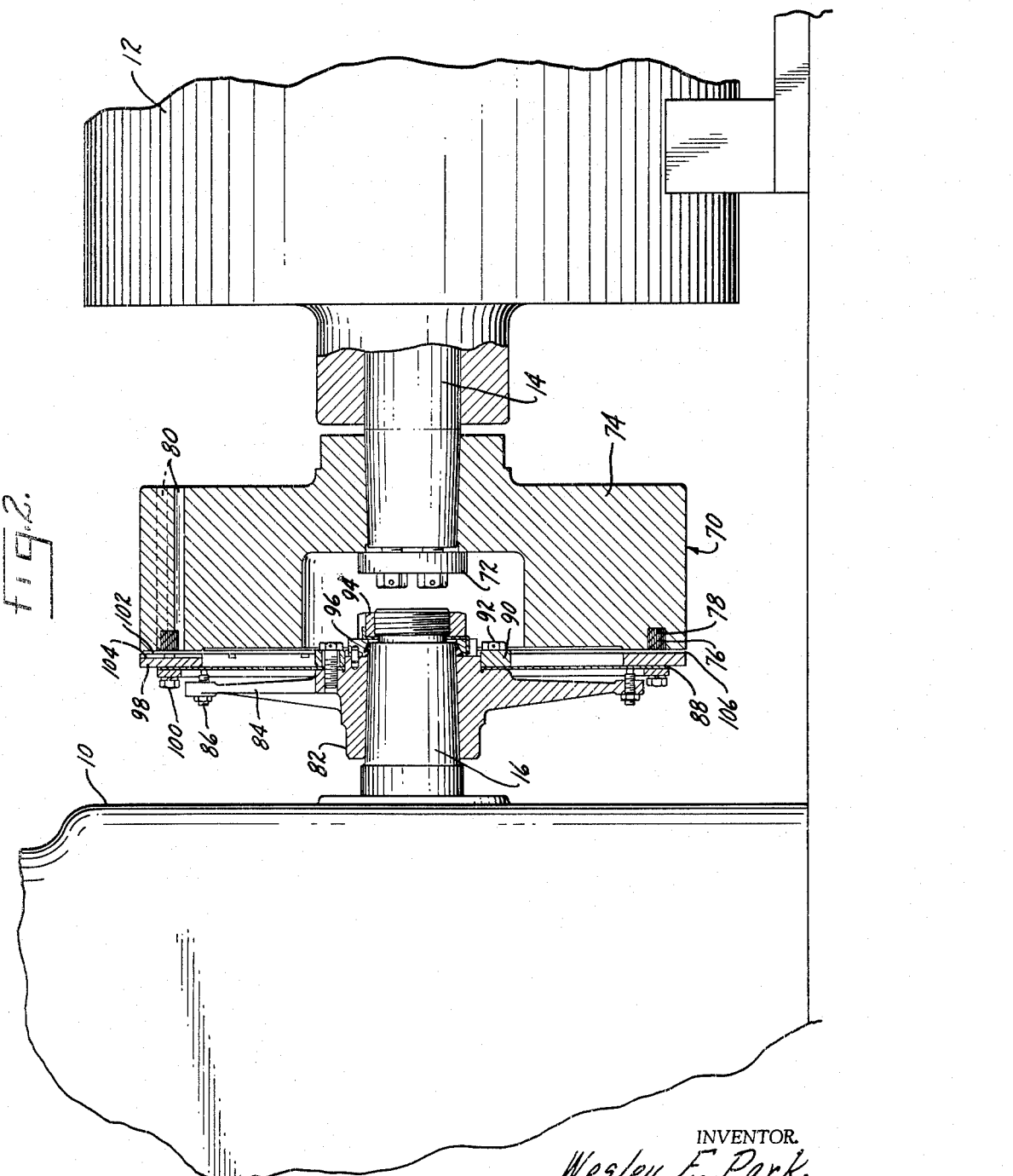
INVENTOR.
Wesley E. Park,
BY Parker & Carter
Attorneys.

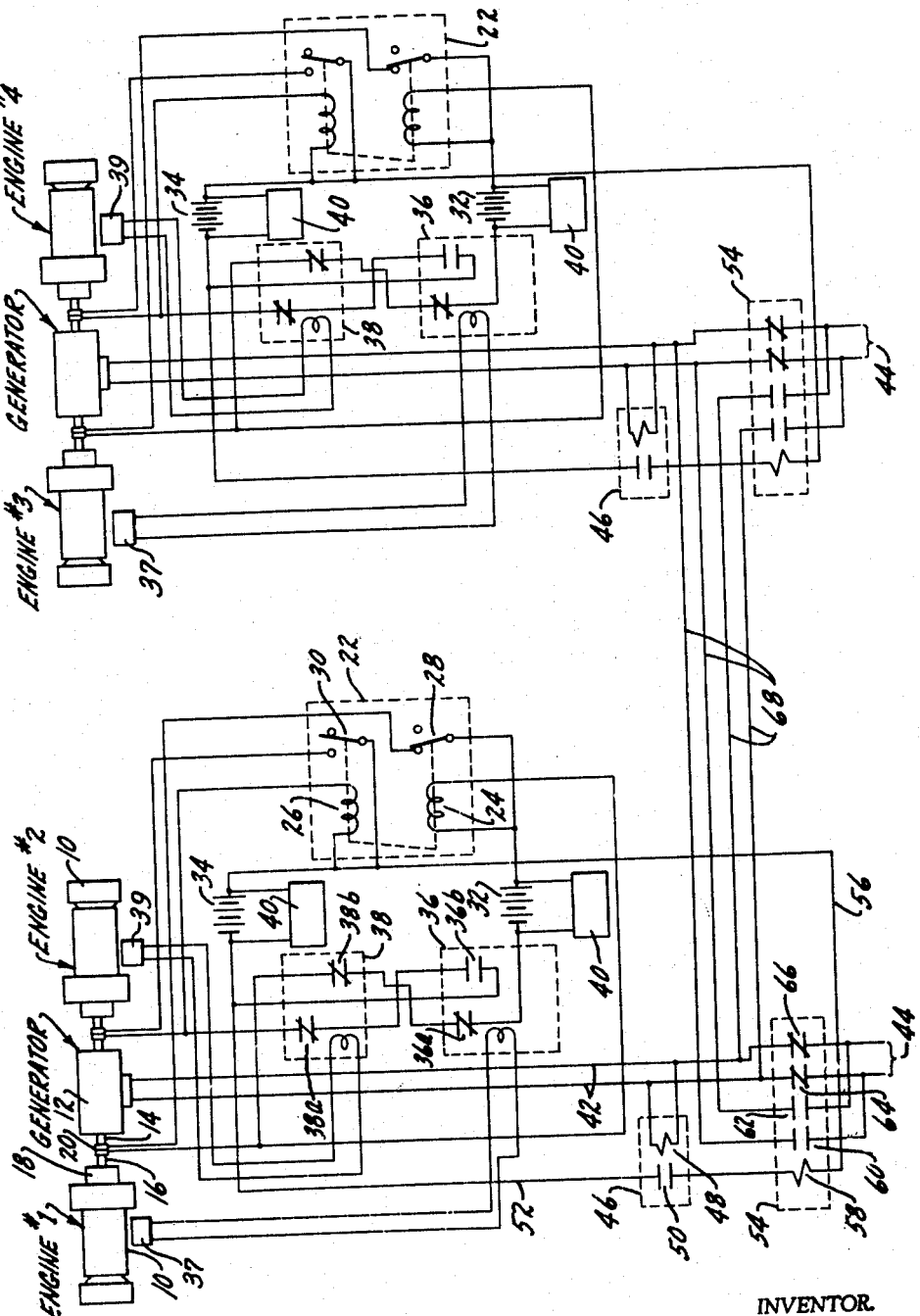

United States Patent Office 3,191,050
Patented June 22, 1965

3,191,050
ENGINE GENERATOR SET
Wesley E. Park, Milwaukee, Wis., assignor to Nordberg Manufacturing Company, Milwaukee, Wis., a corporation of Wisconsin
Filed Oct. 25, 1961, Ser. No. 147,672
1 Claim. (Cl. 290—4)

This invention relates to power plants of the type which are used where no commercial electric power is available.

One purpose of the invention is a power plant of the type described which includes a pair of generators and a control means for switching the load upon the breakdown of either one of the generators or of the prime movers driving the generators.

Another purpose is a power plant, suitable for use in remote locations where no electric power is available, which includes a generator and a pair of prime movers or engines for driving the generator, and switch means for connecting the generator from one engine to the other, upon a malfunction of one of the engines.

Another purpose is a power plant of the type described having a generator and a pair of engines for driving it, one engine normally operating and the other engine being normally inoperative, and means for switching to the inoperative engine and starting it upon the malfunction or failure of the normally operating engine.

Other purposes will appear in the ensuing specification, drawings and claim.

The invention is illustrated diagrammatically in the following drawings wherein:

FIGURE 1 is a schematic diagram of the engines and generators and the electrical controls therefor forming the power plant of this invention, and FIGURE 2 is a partial section of a magnetic clutch used to connect the engines and generators.

In the power plant shown, there may be four engines, each of which is designated at 10, but for purposes of illustration are called engine 1, engine 2, engine 3 and engine 4, respectively. The engines 10 may be any suitable type of gasoline, gas or diesel engine which can satisfactorily operate with a minimum of attention for long periods. The particular type of engine is not essential to the invention providing it takes a minimum of maintenance and operates reliably under the prevailing climate conditions. Positioned between engines 1 and 2 is a generator designated 12 and called generator 1. Similarly, a second generator 12 is positioned between the engines 3 and 4 and has been called generator 2. Each of the generators has a generator shaft 14 which may extend outwardly from each end and is positioned to be drivingly connected with the engine crank shafts 16 which extend outwardly from each of the engines 10.

Clutches 18, which preferably are magnetic clutches, but which may be otherwise, are positioned between each engine and generator. There are four clutches as there are four engines and the clutches may be any suitable type, for example the type of magnetic clutch illustrated in FIGURE 2. Slip rings 20 are shown mounted on the shafts of the generators, the slip rings providing the electrical current for actuating the magnetic clutches. The positioning of the magnetic clutches and the slip rings in FIGURE 1 is merely diagrammatic and illustrates the fact that there are clutches and slip rings for connecting the engines.

Before describing the circuits in detail, it should be pointed out that during normal operation, one of the engines in each pair will drive each generator. The other engine will be a standby engine and will be inoperative. If the engine normally driving the generator should fail or have some other malfunction such that the generator loses its rated output, the electrical circuit described is effective to disengage the magnetic clutch of the first engine, for example, engine 1, and to engage the clutch for engine 2. Each of the magnetic clutches may have a flywheel, or there may be a flywheel mass associated with the generator shaft separate and apart from the clutches which provides sufficient inertia to maintain the generator rotating at rated speed and to provide the inertia for starting the stationary engine 2. In this way, upon engaging the clutch for engine 2, the engine will be started and immediately brought up to speed by the inertia of the flywheel mass and there will be no appreciable drop in the electrical power output from the generator.

As the electrical circuits for each pair of engines and their associated generator are identical, only one circuit will be described and the numbers will be identical on both circuits.

A transfer relay 22 may have a pair of electrical coils 24 and 26, coil 24 operating contacts 28 and coil 26 operating contacts 30. Assuming that engine 1 is the normal operating engine, coil 24 will be energized by battery 32 and contacts 28 will be closed. Battery 34, which supplies a voltage to coil 26, is not connected to this coil and hence contacts 30 are open. In addition to supplying the voltage or current to the coils, each of the batteries also supplies an electric current to operate a magnetic clutch. For example, battery 32 is connected through two engine shutdown and protective devices, which are relays, and are designated at 36 and 38, to the slip rings for engine 1. Relay 36 is effective to operate upon a failure or shutdown of engine 1 and relay 38 is effective to operate upon a failure or shutdown of engine 2. Relay 36 has contacts 36a which always remain closed and contacts 36b which are open, as shown in FIGURE 1, when engine 1 is operating. Similarly, relay 38 has contacts 38a which are normally closed and contacts 38b which are closed as long as engine 2 is shut down and engine 1 is operating. Units 37 and 39 may be used to sense the r.p.m. of engines 1 and 2 respectively and are connected to the operating coils for relays 36 and 38. Whenever the r.p.m. drops below a predetermined minimum, the coil will be actuated to operate its respective relay.

To trace the circuits, battery 32 supplies current to the slip rings 20 of the clutch controlling engine 1 through the relays 36 and 38 and then back through the transfer relay 22 and contacts 28. When engine 2 is operating and engine 1 is shut down, contacts 36b are closed and contacts 38b are open and hence battery 34 supplies current through relays 36 and 38 to the slip rings and then back through contacts 30 to the battery.

Upon a failure in one engine, for example engine 1, contacts 36b close and contacts 38b open. This activates coil 26, closing contacts 30, and deactivates coil 24, opening contacts 28. In this way, current is supplied to the slip rings and clutch controlling engine 2 to operate this clutch, and current is cut off from the slip rings and clutch controlling engine 1 so that this clutch will be disengaged. Thus, engine 1 is no longer driving the generator, but engine 2 is.

As the power plant shown herein may be used at a remote location, it may be advantageous to have a battery charger, indicated at 40, for supplying each of the batteries. There may be a central charger to supply all the batteries or each battery may have an individual charger.

Each of the generators is connected through lines 42 to a load indicated generally at 44. Normally each of the generators will carry half of the total rated load of the installation, although each generator is capable of handling the entire load. Connected across each of the output lines 42 is a voltage loss relay 46 having a coil 48 which controls contacts 50. The contacts 50 are connected through line 52, load transfer relay 54 and line 56 to the battery 32. A voltage loss in the output from the generator will cause coil 48 to close contacts 50 and hence supply current to coil 58 of the load transfer relay 54. Coil 58 operates contacts 60, 62, 64 and 66 which control the output lines of both generators. Contacts 64 and 66 are normally closed so that each generator will supply its part of the load. When coil 58 is energized contacts 64 and 66 will open and contacts 60 and 62 will close. The load of one generator is then connected to the other generator through the transfer lines indicated at 68. In other words, if one generator or both of the engines supplying a generator should fail or otherwise malfunction such that it cannot carry its portion of the rated load, the load will be automatically switched to the other generator by means of the load transfer relays 54 and the lines 68.

The type of clutch used to connect the engines and generators may vary considerably. The clutch may be of the type shown in U.S. Patent 2,972,056 or the clutches may be similar to those shown in co-pending patent applications Serial No. 35,565, now Patent No. 3,077,541 filed June 13, 1960, assigned to the assignee of this invention, and Serial No. 104,031, filed April 19, 1961, also assigned to the assignee of this invention. Any one of these clutches may be used or the clutch may be of a different type. What is important is to provide a clutch which will quickly connect an engine to a generator in such a manner that the inertia provided by a flywheel mass which may be a part of the clutch or separate, will be effective to start the stationary engine and quickly bring it up to rated speed.

FIFURE 2 illustrates one form of clutch which may be used and is similar to the clutch shown in co-pending application Serial No. 104,031 mentioned above. A generator indicated diagrammatically at 12 may have a generator shaft 14. The engine 10 may have an engine crank shaft 16. The generator shaft 14 may mount a high inertia flywheel or clutch member 70 formed of a suitable magnetic material, such as steel, ductile iron or cast iron. The clutch member 70 may be fixed on the shaft 14 by an end plate 72 which is bolted or otherwise secured to the shaft. The member 70 preferably has a large mass such that when rotating it develops a high inertia or torque. The larger portion 74 of the flywheel may extend axially beyond the end of the shaft 14 toward the crank shaft of the engine.

Suitable electric coils 76, which may be a circumferentially wound insulated copper tape, may be positioned in a groove 78 adjacent the outer periphery of the flywheel. It is preferred to have the magnetic field adjacent the outside of the flywheel to thus provide a larger total area for the magnetic field and hence a lower voltage requirement for the coil. Slip rings and brushes are provided to excite the coil electrically. Suitable slots or holes 80 may be formed in the flywheel to provide the electrical connections for the coil.

The engine crank shaft 16 may have a hub 82 fixed thereto with integral radially extending arms 84 mounting adjusting screws 86 at their outward ends. A circular plate or the like 88, preferably flexible and spring-like and of a thin gauge material, for example steel, is fixed on the hub 82 and to the radial arms 84 by a collar 90 and screws or the like 92. A nut 94 may be threadedly mounted on the end of the shaft 16 and is used to hold the hub 82 in position to a spacer or the like 96.

A steel or magnetic armature 98 is mounted on the plate 88 adjacent its outer periphery by means of a plurality of screws or the like 100. Preferably, the surface 102 of the armature which opposes the flywheel is divided by radially extending slots 104. The slots are particularly advantages in reducing or eliminating induced currents in the armature which oppose the flux buildup in the flywheel.

The armature 98 is spaced from the flywheel a distance 106 which is the air gap. The air gap 106 may be variable so that the time between application of electric power to the coil and operation of the clutch can be varied. The adjustment of this time or the adjustment of the air gap is accomplished by the screws 86 which have an end in contact with the back of the plate 88.

In operation, upon exciting the electric coil 76, the armature 98 will be quickly pulled into contact with the flywheel and thus the inertia of the flywheel will be transferred through the armature and the radially extending arms to the engine crank shaft to start the engine. Although the term "flywheel" has been used, it should be understood that this term designates any suitable type of inertia member which is drivingly connected to the generator shaft and rotated thereby.

The use, operation and function of the invention are as follows:

Today's nationwide communication networks require the location of radio relay stations or other types of communication equipment at remote locations, generally where no commercial power is available. The present invention discloses a type of power plant which may be used as a remote power station and it is designed to continuously supply regulated electric power over an extended period of time and with little maintenance. The power station may include a generator and two engines for operating it, one of the engines being normally connected to the generator and driving it. The other engine functions as a standby engine and is connected to drive the generator upon a malfunction of the first engine. In order to provide the connection between the engines and generators magnetic clutches may be used which are operated by a failure in the rated output of the generator or by some indication of trouble from the engine itself. If the output of the generator goes down, signalling a possible malfunction of the engine, one magnetic clutch is disengaged and the other clutch is engaged. The generator shaft is preferably drivingly connected to a flywheel or inertia mass which is continually rotating. After one engine has been disengaged, the flywheel mass will maintain the generator speed as close to normal as possible so that the voltage and frequency will not be appreciably affected. The flywheel mass will also serve as the starting intertia or starting torque for the standby engine. The flywheel mass will be connected to the crank shaft of the standby engine through the clutch connecting the second engine to the generator. The particular type of clutch used is not important and a variety of clutches may be used providing they are fast-acting and can satisfactorily transmit the high torque necessary to start the standby engine.

Although a pair of engines and a single generator are satisfactory, it is preferred to use two generators and a pair of engines for each. In this way, each generator can normally carry one-half of the rated load of the station, although each generator should be capable of carrying the entire load. In such an arrangement, normally each generator will carry one-half the load and will be driven by one of the engines. Upon failure of a particular engine, the standby engine for that generator will be started and connected to the engine. In the event that both of the engines driving a particular generator should fail or in the event that a generator should fail, the entire load will be automatically switched to a single generator which will then supply all of the power needed for the station. With this arrangement it is very unlikely that all four engines would go out or that both generators would go out. In other words, the station can continue to operate even though there are a number of malfunctions in the engines.

Although the particular means for actuating the engine shutdown and protection devices are not shown, it should be obvious that these devices may be suitably connected to the engines so as to be sensitive to their operating characteristics, or they may be connected to the generators in such a manner that a reduction in voltage will actuate these devices.

The type of engine and the type of generator are not essential to the invention. In general, the engine should be one that can operate for long periods of time and with little maintenance. In addition, it should operate reliably and satisfactorily under the climatic conditions prevailing. Likewise, the generator should be one which operates with a minimum of maintenance over an extended period.

The particular switching means for disengaging one magnetic clutch and engaging the other may vary, although the circuit arrangement shown has been found to be satisfactory. In like manner, the means for transferring the load from one generator to the other may vary, although in general such a transfer arrangement should be kept as simple as possible.

The invention has been described as having two generators, both of which normally operate. It is also possible to have three or more generators, similarly connected, which can divide up the load, but carry the entire load if necessary.

Whereas the preferred form of the invention has been shown and described herein, it should be realized that there are many modifications, substitutions and alterations thereto within the scope of the following claim.

I claim:

A means for supplying electric power including a pair of electric generators each having a generator shaft and a flywheel mass connected to each generator shaft for continuous rotation thereby, a pair of engines for each generator, each engine being positioned for driving connection with an end of a generator shaft, a magnetically operated clutch for connecting each engine to a generator shaft, means for controlling the operation of the clutches and engines such that each generator is driven by a single engine with the clutch between that engine and generator being operated, means for disengaging any operated clutch upon a malfunction of its associated engine and for operating the other clutch associated with that generator to connect the engine associated with said other clutch to the generator, the flywheel mass providing the inertia to start said other engine so that it then drives the generator, each of said generators being connected to a common load and normally carrying one half of the total load, a load sensitive relay connected to the output of each generator, with each relay arranged to switch the total load to one generator upon a malfunction of both engines driving the other generator.

References Cited by the Examiner

UNITED STATES PATENTS

| | | | |
|---|---|---|---|
| 2,012,425 | 8/35 | Gemmell | 290—4 |
| 2,119,156 | 5/38 | Finnegan et al. | 290—30 |
| 2,911,541 | 11/59 | Neufville et al. | 290—4 |

ORIS L. RADER, *Primary Examiner.*

MILTON O. HIRSHFIELD, *Examiner.*